Oct. 2, 1928.
A. C. WENAK
1,686,428
BORING BAR
Filed Nov. 5, 1923     3 Sheets-Sheet 1
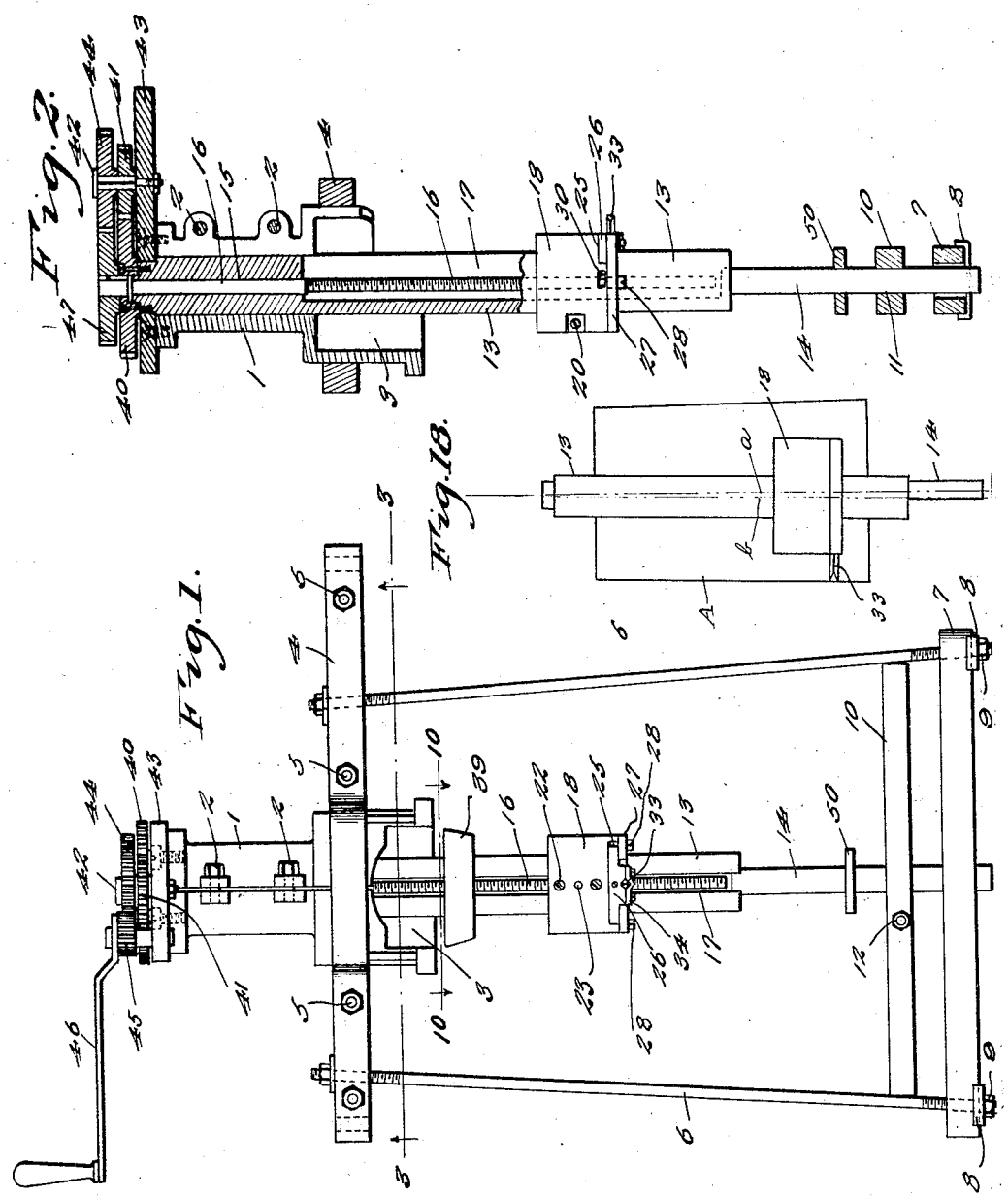
A. C. Wenak
INVENTOR Oct. 2, 1928.
A. C. WENAK
BORING BAR
Filed Nov. 5, 1923
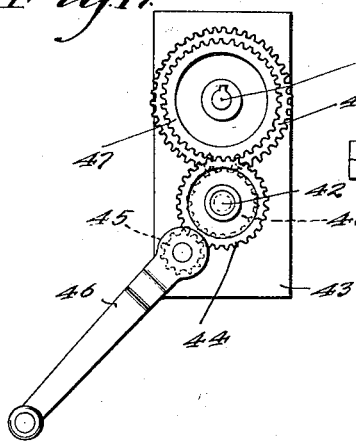
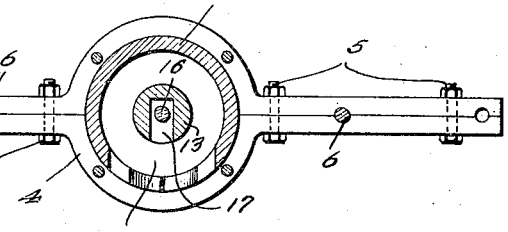
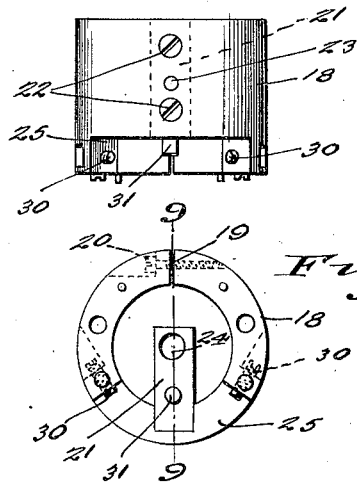
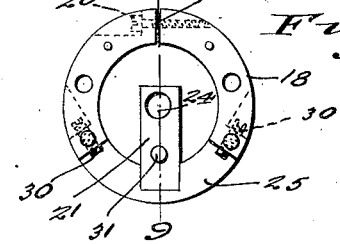
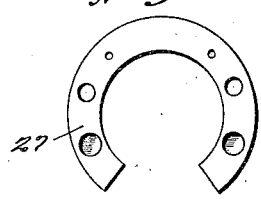
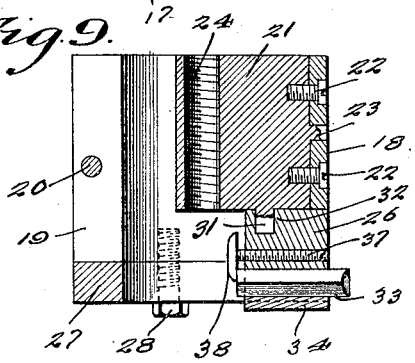
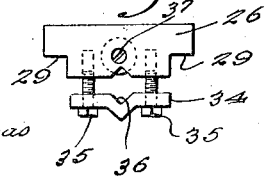
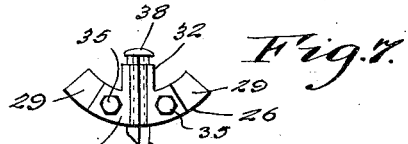
A. C. Wenak INVENTOR Oct. 2, 1928.
A. C. WENAK
BORING BAR
Filed Nov. 5, 1923
1,686,428
3 Sheets-Sheet 3
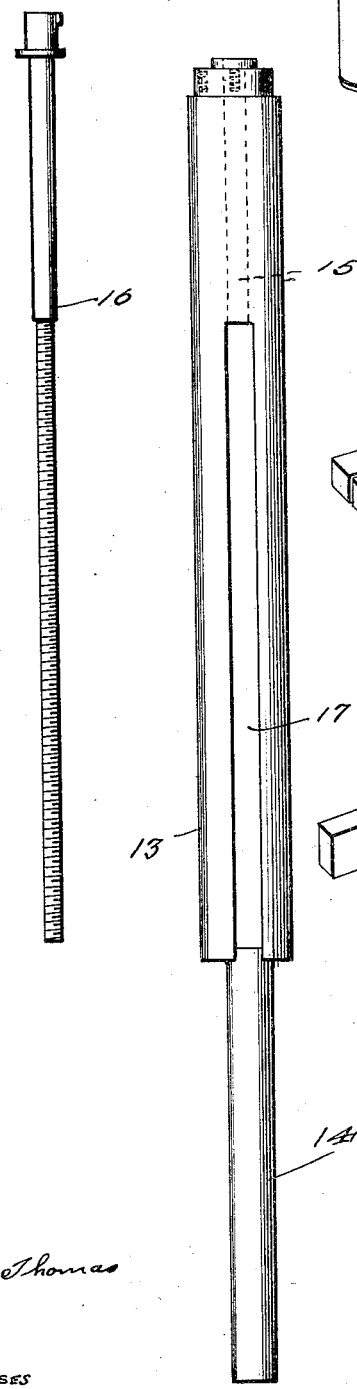
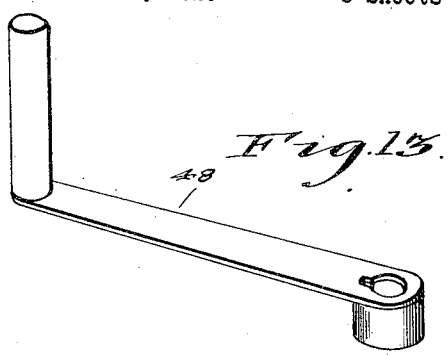
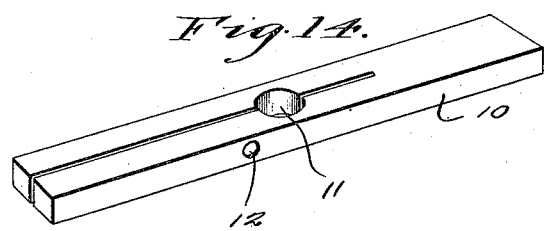
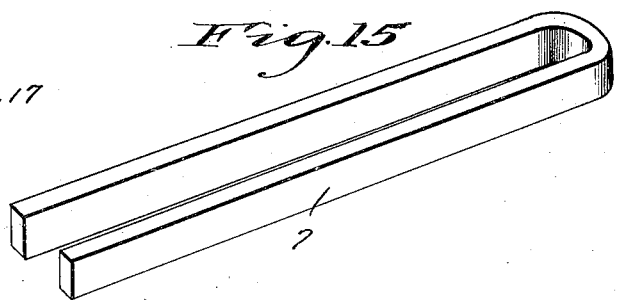
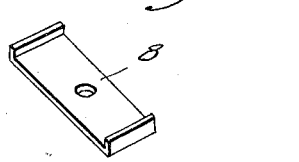
A. C. Wenak INVENTOR
BY Victor J. Evans ATTORNEY
WITNESSES Patented Oct. 2, 1928.

1,686,428

UNITED STATES PATENT OFFICE.

ARCHIE CALVIN WENAK, OF MUSCATINE, IOWA.

BORING BAR.

Application filed November 5, 1923. Serial No. 672,919.

This invention relates to a device for reboring cylinders and the like, the general object of the invention being to provide a cutter, a member carrying the same and means for rotating the member to cause the cutter to engage the object to be cut and means for feeding the member longitudinally to bring the cutter against new portions of the object.

Another object of the invention is to provide means for moving the member longitudinally without rotating it so as to adjust the cutter to the work piece and remove it therefrom.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of the invention.

Figure 2 is a longitudinal sectional view through portions thereof.

Figure 3 is a section on line 3—3 of Figure 1.

Figure 4 is a view of the carrier for the cutter.

Figure 5 is a top plan view thereof.

Figure 6 is a view of the holding ring for holding the cutter on the carrier.

Figures 7 and 8 are views of the cutter clamp and cutter.

Figure 9 is a section on line 9—9 of Figure 5.

Figure 10 is a section on line 10—10 of Figure 1.

Figure 11 is a view of the screw shaft.

Figure 12 is a view of the rotary member which carries the screw shaft.

Figure 13 is a view of the crank for rotating the shaft.

Figure 14 is a view of the lower bearing bar.

Figure 15 is a view of the U-shaped clamp.

Figure 16 is a view of one of the channel plates for engaging the clamp.

Figure 17 is a plan view showing the gearing.

Figure 18 is a diagrammatic view showing how the parts are arranged to give the cylinder a tapered bore.

In these views, 1 indicates a housing which is split and the split parts are connected together by the bolts 2. This housing has its lower end enlarged to provide a chamber 3 and it is supported by the yoke 4, the parts of which are held in clamping position around the housing by the bolt 5 and this yoke is supported by the rods 6 which have their lower ends passing through the U-shaped member 7 which is supported by the channel plates 8 held to the ends of the rods by the nuts 9. A bearing block 10, preferably formed of hardwood and split for a portion of its length has a hole 11 therein which is adapted to be clamped around the member which it engages by means of the bolt 12 passing through the split portions. The cylinder block is placed between the bottom of the housing and said bearing block and then the parts are clamped on the block by screwing up the nuts 9 on the rods 6 to bring the U-shaped member 7 against the bearing block 10. A tubular member 13 is rotatably mounted in the housing and this member has a reduced lower end 14 which engages the opening 11 in the bearing block 10 so that said member 13 has a bearing for its upper part in the housing 1 and a bearing for its lower part in the block. The member is provided with a bore 15 in its upper part which forms a bearing for the plain part of a screw shaft 16 and it has a slot 17 in its middle portion into which the screw section of the shaft 16 projects. The tool head 18 is of cylindrical shape and fits around the member 13 and is adjustable thereon by being split, as at 19, with the split portions held together by the bolts 20. A nut member 21 is held to the tool head by the screws 22 and the projection 23 which engages a hole in the side of the head. This nut member is provided with a threaded bore 24 for receiving the threaded part of the shaft 16. Thus when the shaft is rotated the tool head will be moved longitudinally on the member 13. The lower end of the head is provided with a recess 25 at one side thereof to receive the tool carrying block 26 which is held in place by the split ring 27, held to the bottom of the head by the bolts 28 and having its ends engaging recesses 29 in the block. Adjusting screws 30 are carried by the head and have their ends projecting into the recess 25 so as to engage the ends of the block for moving the same about the pivot 31 which is carried by the nut member 21 and enters a hole formed at the center of the block on a projecting part 32 thereof. Thus by adjusting the block by means of these screws the cutter 33 can be set to make cuts of different depths. This cutter is held to the block by means of the jaw 34 which is held to the lower face of the block by the bolts 35, said lower face of the block and the face of the plate being recessed, as at 36, to receive the tool. The cutter is adjusted longitudinally on the block by means of the screw 37 passing through the block and having a head 38 on its inner end for engaging the rear end of the cutter. A centering device 39 of horseshoe shape is carried by the member 13 for centering the device in the cylinder to be bored, and a gear 40 is connected with the upper end of the member 13, this gear being engaged by the pinion 41 on a stub shaft 42 which is carried by a plate 43 bolted to the top of the housing. This shaft carries a second pinion 44 which is engaged by a pinion 45 on a crank handle 46 which is pivoted to the plate. This gear 44 also engages a gear 47 which is keyed to the shaft 16 in such a manner that it can be easily removed from the shaft so that a second crank handle 48 can be placed on the end of the shaft to rotate the same without moving the member 13.

In using the device, the tool head is first raised into the chamber 3 of the housing to permit the device to be placed on the cylinder block. After the device is clamped to the cylinder block, as before described, and the parts centered by the device 39, the shaft 16 is rotated by the crank 48 to lower the cutter head to bring the tool into cutting position. The crank 48 is then removed and the gear 47 substituted and then the device is actuated by the crank handle 46. This will rotate both the shaft 16 and the member 13 so that the tool head is fed downwardly through the cylinder and at the same time rotated to cause the tool to engage all parts of the cylinder walls. I prefer to move the block by its adjusting screws about one-fourth inch ahead of the center so that it turns in a small diameter to make the "roughing" cut. After the tool passes through the cylinder the gear 47 is removed and the crank 48 substituted therefore and then the shaft 16 is turned by this crank to bring the cutter head back to its starting point. The tool block is then adjusted to make the finishing cut after which the gear 47 is put back in place and the cutter head fed through the cylinder again to make the finishing cut.

This machine will accurately rebore cylinders and it is so simple in construction that it can be handled by unskilled labor, after the proper adjustments have been made.

A washer 50 is arranged on the part 14 of the member 13 to protect the lower bearing.

As shown in Figure 18, the parts are arranged so that the cylinder is given a tapered bore which is larger at its bottom than at its top. The cylinder must be approximately .001 of an inch larger at the bottom than it is at the top in order to compensate for the wear at the top of the cylinder from the piston rings and the greater expansion of the cylinder at the top than at the bottom. In order to do this the small part 14 of the tubular member 13 is eccentrically arranged with relation to the large part of said member, as shown by the lines $a$ and $b$ in Figure 18. The top and the lower bearings are set on the line $a$ so that the lower part of the member 13 will travel in a circular path with this line $a$ as its axis. Thus as the tool head 18 travels downwardly it will be rotated in a circle, the diameter of which is gradually increasing so as to give the cylinder the tapered bore, as shown at A in Figure 18 though it is to be understood that this is exaggerated in order to properly show the construction. In actual practice the lower part of this bore will be .001 of an inch larger than the top.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the character described comprising spaced supporting members, said members being provided with communicating semi-circular portions, a housing member supported within the enclosure defined by the semi-circular portions, a tubular member split for an appreciable portion of its length being carried within the housing, a reduced extension depending from the lower end of the tubular member, a bearing block split for an appreciable portion of its length and having communication with an opening adapted to accommodate the lowermost end of the extension, a shaft extended centrally of and threaded within the tubular member, a tool head carried by the tubular member and adapted to receive the threaded portion of the shaft to move the head longitudinally of and upon the tubular member, a cutter member carried by and horizontally disposed from the tool head, and means for imparting rotary movement to the tubular member and tool head.

In testimony whereof I affix my signature.

ARCHIE CALVIN WENAK.